Sept. 5, 1933. G. A. RUTKOSKIE Re. 18,931

APPARATUS FOR PRODUCING WAX CARBON SPOTS ON SHEETS OF PAPER BY IMPRESSION

Original Filed April 14, 1931 5 Sheets-Sheet 1

Inventor
George A. Rutkoskie
By his Attorney
Harvey Lee Dodson

APPARATUS FOR PRODUCING WAX CARBON SPOTS ON SHEETS OF PAPER BY IMPRESSION

Original Filed April 14, 1931 5 Sheets-Sheet 2

Inventor
George A. Rutkoskie
By his Attorney
Harry Sea Dodson

APPARATUS FOR PRODUCING WAX CARBON SPOTS ON SHEETS OF PAPER BY IMPRESSION

Original Filed April 14, 1931 5 Sheets-Sheet 3

Inventor
George A. Rutkoskie
By his Attorney
Harvey Lea Dodson

Sept. 5, 1933. G. A. RUTKOSKIE Re. 18,931

APPARATUS FOR PRODUCING WAX CARBON SPOTS ON SHEETS OF PAPER BY IMPRESSION

Original Filed April 14, 1931 5 Sheets-Sheet 4

Inventor
George A. Rutkoskie
By his Attorney
Harvey Lee Dodson

Sept. 5, 1933. G. A. RUTKOSKIE Re. 18,931

APPARATUS FOR PRODUCING WAX CARBON SPOTS ON SHEETS OF PAPER BY IMPRESSION

Original Filed April 14, 1931 5 Sheets-Sheet 5

Inventor
George A Rutkoskie
By his Attorney
Harry Lee Dodson

Reissued Sept. 5, 1933

Re. 18,931

UNITED STATES PATENT OFFICE 18,931

APPARATUS FOR PRODUCING WAX CARBON SPOTS ON SHEETS OF PAPER BY IMPRESSION

George A. Rutkoskie, Athens, Ohio, assignor to The McBee Binder Company, Athens, Ohio, a corporation of Ohio Original No. 1,860,957, dated May 31, 1932, Serial No. 529,907, April 14, 1931. Application for reissue July 26, 1933. Serial No. 682,165

37 Claims. (Cl. 101—250)

This application is designed to employ the method described in my co-pending application Serial No. 529,908, filed April 14, 1931.

My invention relates to that class of spot carbon paper where it is desirable to settle a transaction in one instance so that by one operation a number of forms may be written, each with different printed wording, and if sheets of carbon paper were inserted between the various printed sheets everything written on the top sheet would be exactly copied on the other forms. As this often is not desirable, it is necessary to have the carbon only on that part of the sheet of paper to which it is desired to transfer the written matter on the first sheet. It is thus possible in a single operation to fill a number of forms, each of which will have an entirely different text.

Certain attempts have been made to accomplish this result, but the machines with which I am familiar are all subject to certain objections which are so great as to militate greatly against their commercial use. Only one attempt was made to produce a spot carbon sheet of paper by impression and that was by one Maxedon, exemplified in United States Patent 935,801, but his patent was directed to a manifolding sheet having placed upon one face by impression a manifolding material in the nature of printer's ink and he described his manifolding material as comprising commercial axle grease and lamp black. This black grease penetrates the paper so that it is nearly impossible to read the writing on the top sheet while the sheet contacting with the face of the manifolding became so smeared as to be scarcely legible.

The other machines for this purpose are made to be used on rotary printing presses and the paper is taken from a roll, passed over a series of rolls, brought into contact with a roller which is provided with spots produced usually by a stencil though sometimes by cutting away the portions of the roll not intended to be used to transfer the carbon ink to the paper.

One of the principal objections to this method of producing spot carbon paper is due to the fact that you have to run an entire roll of paper or else set up the press for a small run and the cost of such procedure would be prohibitive, and secondly that you have to have innumerable transfer rolls, this being commercially impractical because the requirements for spot carbon paper vary practically with every order given.

My invention has for its principal object to produce an apparatus which can be installed on an ordinary printing press so that when the job is finished the press can be used for its regular work.

My invention has for its further object to provide means so that I can provide in a definite position any number of wax carbon spots of any size, limited only by the size of the press used, and in any position on any size of sheet, this also being limited only by the size of the press used.

A further object is to produce such wax carbon spots on any grade or weight of paper that can be handled on the ordinary automatic feed printing press.

A further object of the invention is to provide heating means for the wax carbon and all parts which come in contact with it.

A further object is to provide means for varying the degree of heat.

A further object is to provide means for heating the lock-up base carried by the type bed plate of the press.

The temperature necessary to obtain satisfactory results is very essential. Too much heat will cause the compound to penetrate the spot and is also liable to burn the carbon. While if it goes still higher it will crystallize and not be usable at all. While not enough heat will cause the compound to collect on the printing plate in excess and this makes an uneven print which is easily offset when put under the trimming knife when the carbonized forms are trimmed to proper size. For that reason, I provide a variable regulator for the control of the heat.

I have found by experience that it is necessary to watch the heat on all of the various heating elements employed which can be readily controlled by the control switches provided for that purpose. I have found that by locating electric heating elements having variable temperatures in various positions on the press and the use of the standard rollers used for ordinary printing but made to stand a temperature of approximately 200° F., then gearing these composition rollers so that they are positively driven and using a specially constructed lock-up base on which to lock regular electroplates such as are used for producing solids in ordinary printing, I am able to produce with the use of a wax base carbon compound, wax carbon impressions of any size and in my position and on any kind of paper limited only by the size of the printing press used. I have also discovered that the best results are obtained by having the face of the electrotypes nickeled and polished, which allows the melted compound to spread evenly over the plate which results in the production of an even and smoother finish to the carbon and greatly diminishes any tendency to smear.

A further object is to provide means for positively rotating the various rollers. I have discovered and believe one of the causes for the failure of prior machines to be the fact that while ordinary printing ink has sufficient tack to drive the various rollers, the compound used for producing this wax carbon has no tack whatever and it is therefore necessary that all rollers have a positive drive and must be rotating when they contact.

A further object of my invention is to provide for a soft packing on the printing cylinder to keep the edges of the printed form free from excess carbon.

A further object of my invention is to prevent any of the melted compound dropping from the first rollers in the train reaching the bed of the press.

My means for accomplishing the foregoing objects may be more readily understood by having reference to the accompanying drawings which are hereunto annexed and are a part of this specification in which I have shown my improved apparatus attached to an ordinary automatic feed printing press of the Kelley type. Obviously inasmuch as my invention is not restricted to any particular type of press I have not illustrated the operating parts of the press except where necessary to furnish a complete description of my invention so that it may be practiced by persons skilled in the art and the construction hereinafter described is used because it adapts itself conveniently to manufacturing purposes, but it is by no means essential and is illustrated and described merely as one of a variety of desirable structures and not with a view in any way of limiting my invention to such specific details.

Similar reference numerals refer to similar parts throughout the entire description.

Figure 1:
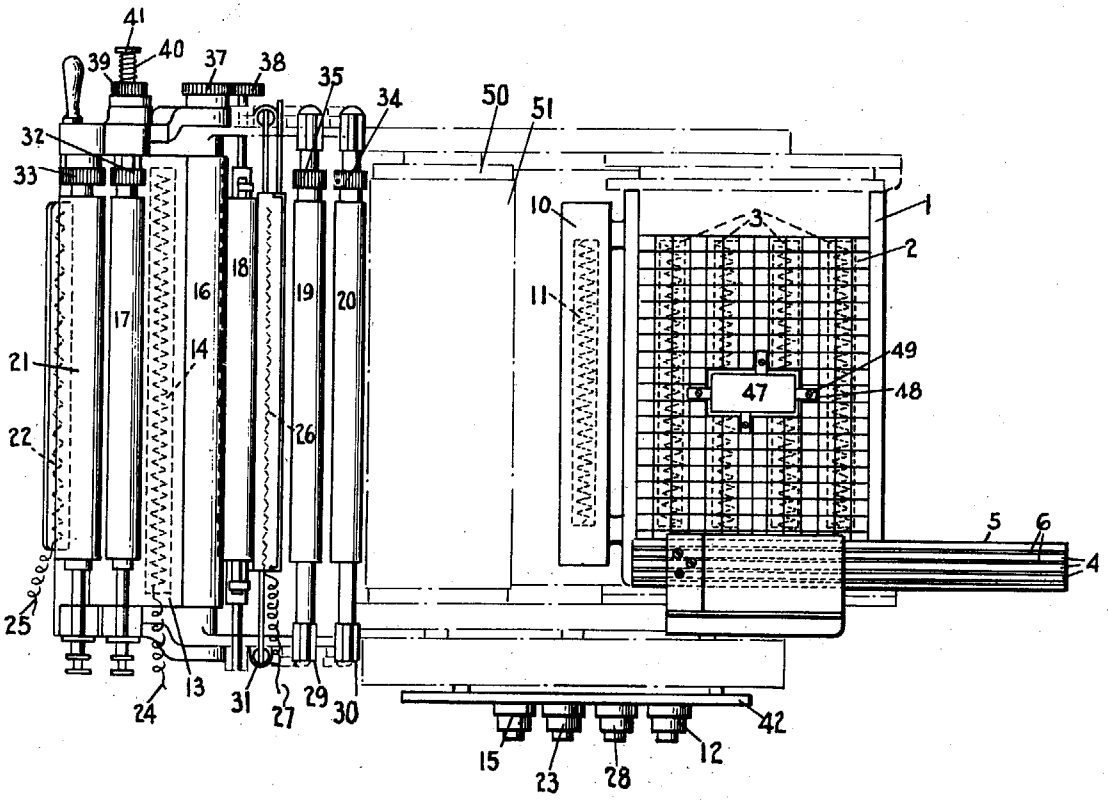
Fig. 1 is a top or plan view of my invention applied to an ordinary automatic feed printing press.
Figure 2:
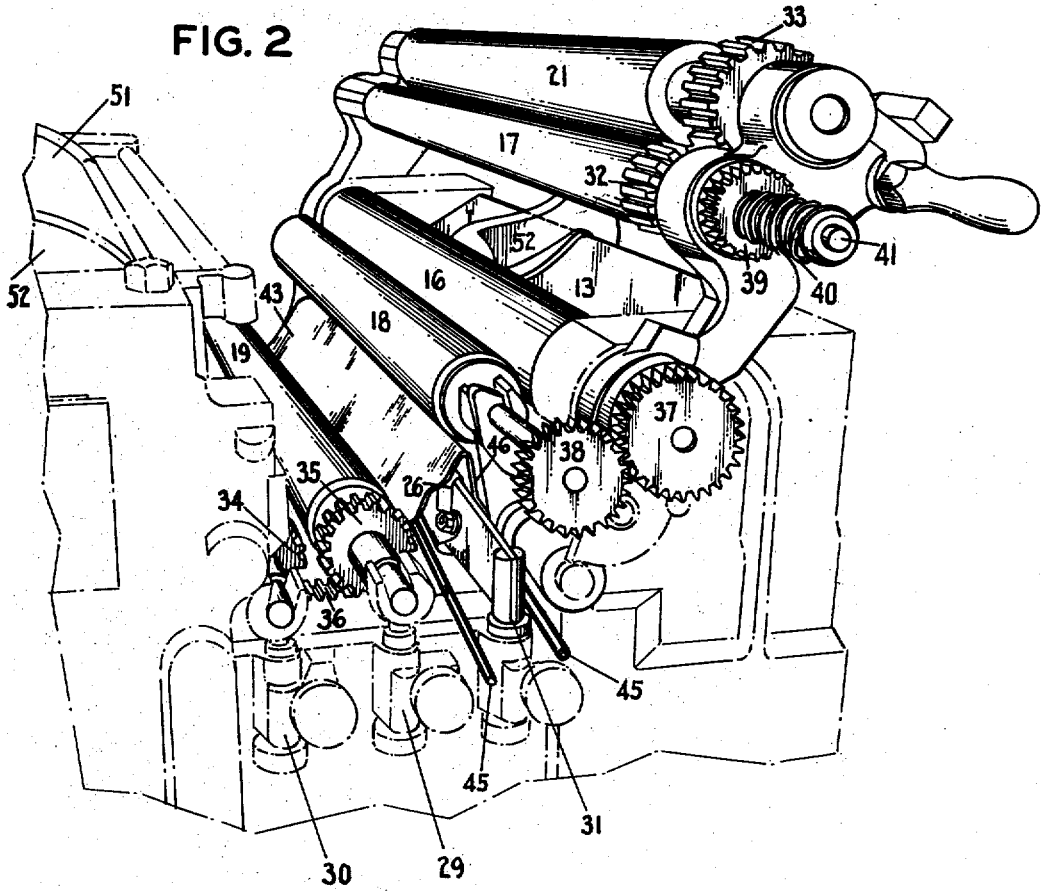
Fig. 2 is a perspective view showing the rollers opened permitting a clear view of the ink fountain.
Figure 9:
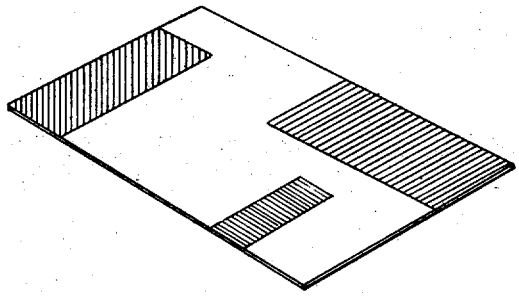
Fig. 9 is a perspective view of a form after it has received the spot carbon impressions.
Figure 3:
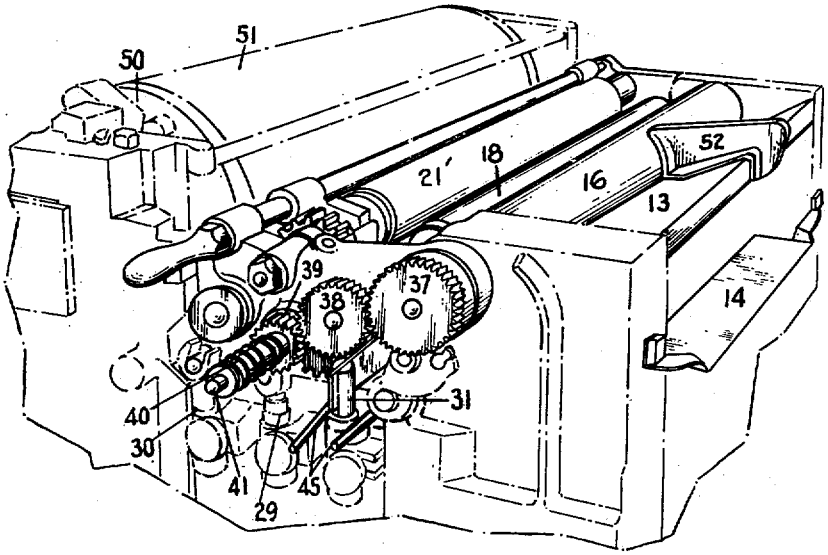
Fig. 3 is a perspective view with the rollers in position.

As shown in the drawings the type bed 1 of an ordinary printing press has mounted thereon a special lock up base 2. This base is heated by electric heating elements 3, as shown they are four in number, and are connected to a control circuit by means of sliding contacts 4 which are mounted in a gutter 5, suitable insulation 6 being provided to insulate the electric current. Three carbon brushes 7 are provided to make contact with the sliding contacts 4, the brushes being held in contact by coil springs 8 mounted in caps 9, of the usual or standard construction for this purpose, so as to provide means to regulate the tension which the springs exert upon the carbon brushes 7. It will be apparent from this description that the type bed 1 can be reciprocated without in any manner affecting the effectiveness of the electrical contacts which convey current to the heating elements in the lock-up base 2.

The ink plate 10 is also heated by an electric element 11 which is connected to the sliding contacts 4 and is controlled by the same switch 12 which conveys current to the carbon brushes 7. This switch is a standard switch providing three positions, high, medium and low, so that varying degrees of temperature for the heating elements 3 and 11 can be maintained.

The dry wax carbon compound is placed in an ink fountain 13 which is heated by an electric heating element 14 located directly under the ink fountain 13, the element being connected by suitable conductors 24 to a standard switch 15. The melted compound is separated by the ink fountain roller 16 and carried to the steel vibrator 17 by the ductor roller 18 which is preferably formed of a special composition which will withstand approximately a temperature of 200° F.

The melted compound is distributed to form rollers 19 and 20 also constructed of a special composition, by the aid of a standard rubber roller 21 used for ordinary printing, this roller riding the steel vibrator 17 and ductor 18. Adjacent these rollers I also provide an electric heating element 22 which is connected to a standard switch 23 by suitable conductors 25. I remove one of the form rollers from the press and mount in its place a heating element 26 which is connected by suitable conductors 27 to a switch 28. The other form rollers 19 and 20 are carried in the usual roll bearing brackets 29 and 30, the brackets 31 being used to hold the heating element 26 in position, this element being necessary to keep the melted compound and the rollers at the correct working temperature.

As already pointed out, I have discovered that unlike ordinary printing ink, the wax carbon which is used in producing this spot carbon paper has no tack and therefore it is necessary that all of the rollers have a positive drive and that if, at the time of contact the rollers are not rotating, it is impossible to produce a satisfactory job. Therefore, I have found it necessary to provide additional gears for such rollers as are not equipped with gears in the regular press.

As is well known, the form rollers 19 and 20 drive the gears 32 and 33 on the steel vibrator 17 and roller 21 which mesh with gears 34 and 35 on the form rollers, all of these gears being located inside of the frame of the press and being driven by the reciprocation of the rack 36 in the usual manner.

However, I have to provide a special gear 37 for the fountain roller 16 and a gear 38 for the ductor roller 18 and a gear 39 for the steel vibrator. The gears on the ink fountain roller 16, and the steel vibrator roller 17 drive the gear 38 on the ductor roller so that this roller is caused to rotate when it contacts either the ink fountain roller 16 or the steel vibrator roller 17 as it travels between these two rollers.

Figure 4:
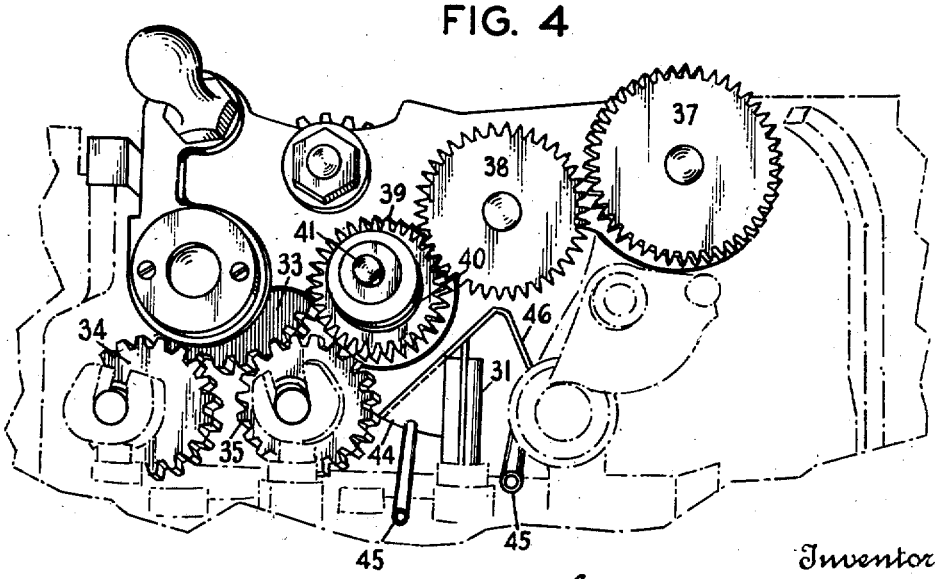
Fig. 4 is an end elevation of the gear side of the press showing the gear on the vibrator roller in mesh with the gear on the ductor roller.

As stated before, it is absolutely essential that these rollers rotate at the time of contact. I find it desirable, therefore, to form the teeth of the gears 37, 38 and 39 pointed so that it will be impossible for them to contact edge to edge as the ductor roller travels back and forth and thus fail to properly mesh with the teeth of the adjoining gear. As seen in Fig. 4 the gear 38 on the ductor roller 18 is in mesh with the gear 39 on the steel vibrator 17.

Figure 5:
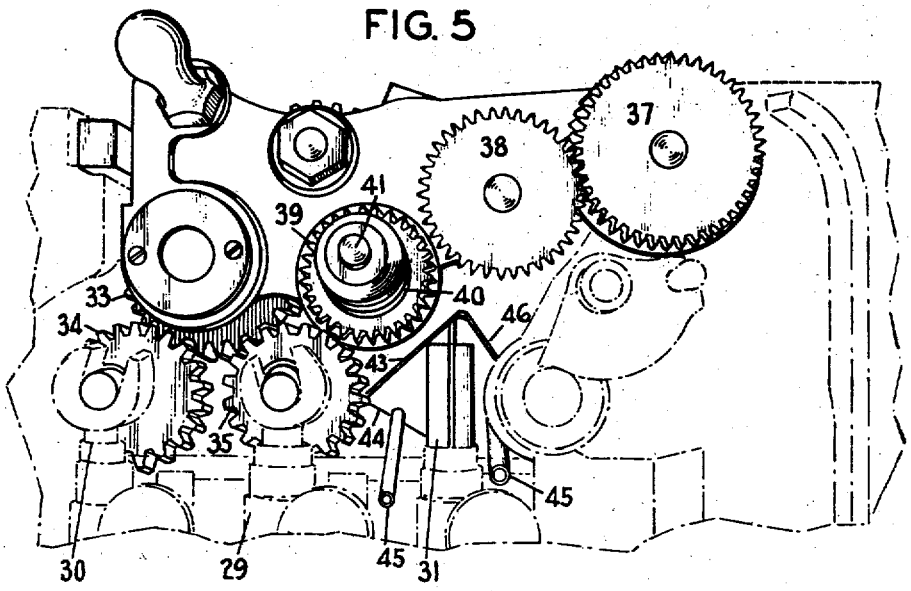
Fig. 5 is a similar view showing the gear on the vibrator roller in mesh with the gear on the ink fountain roller.
Figure 6:
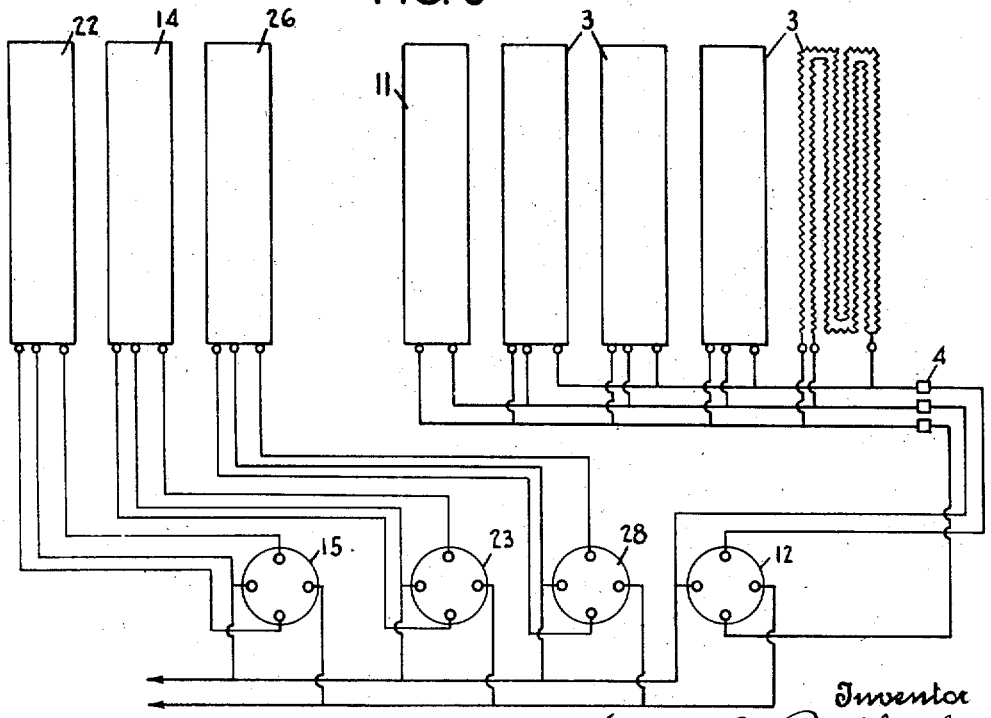
Fig. 6 is the wiring diagram of the various heating elements.
Figures 7, 8:
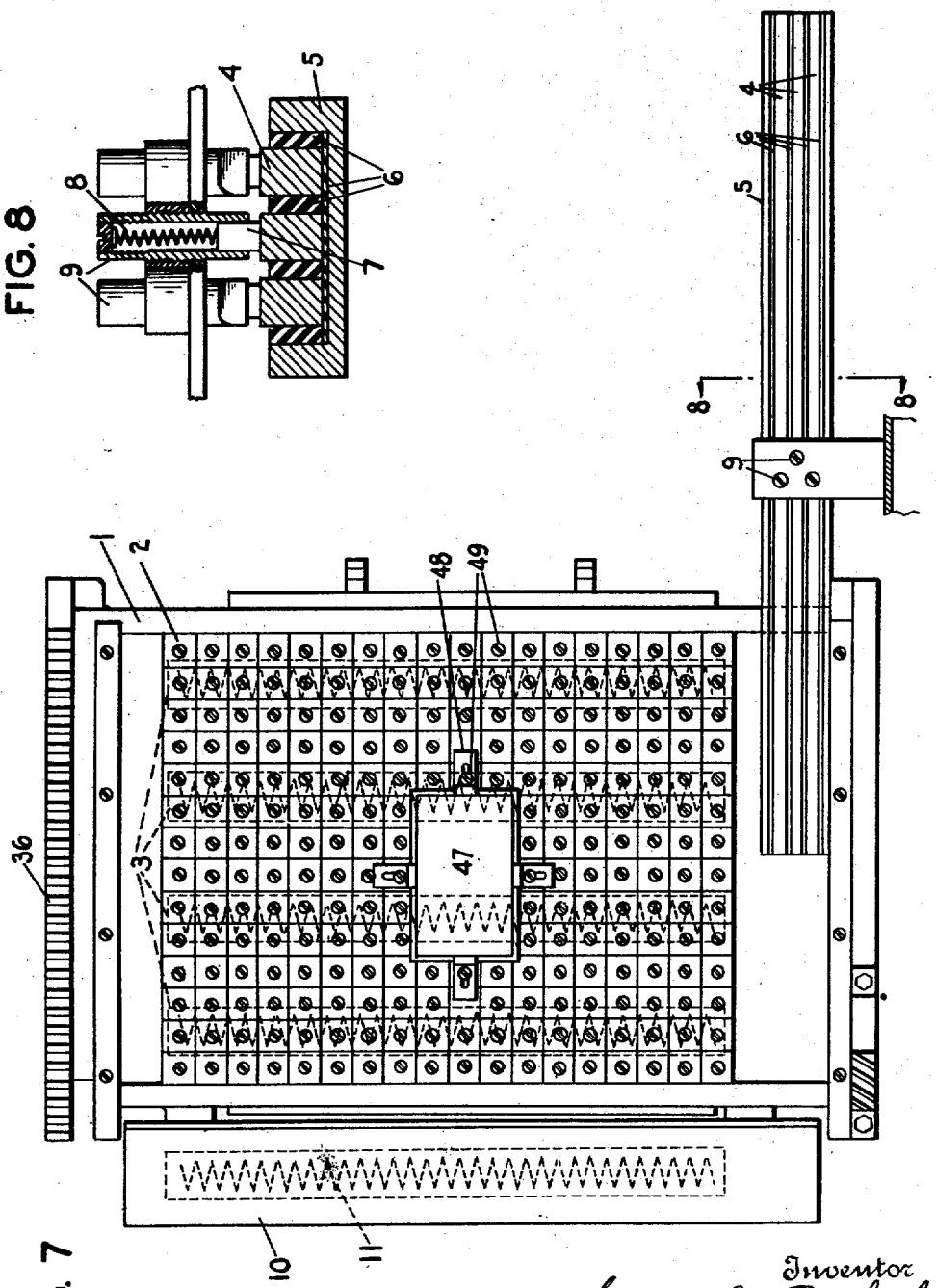
Fig. 7 is a top or plan view of the bed of the press showing the arrangement for heating the ink plate and the special heated lock-up base and the means for maintaining electrical contact for the elements on the ink plate and the special lock-up base.
Fig. 8 is an enlarged section of the sliding contacts on the line 8—8 in Fig. 7 showing the carbon brushes.

In Fig. 5, the ductor roller has caused the gear 38 to engage the gear 37 on the ink fountain roller. A coil spring 40 is mounted on the end of the shaft 41 of the vibrator roller 17 and exerts a tension against the gear 39 which is splined on the shaft 41 thus insuring it always being in the proper plane to mesh with the gear 38 on the ductor roller 18 as it travels back and forth between the ink fountain roller and the steel vibrator roller 17.

I have found that it is desirable to mount the switches for the control of the electric current on a panel 42. As clearly seen from the wiring diagram these switches allow for three heats, low, high, and medium, which I have found is absolutely necessary in order to produce satisfactory results.

The heating element 26 is provided with a shield 43 preferably made of cold rolled steel, the bottom part of the shield which is nearest the roller extending out about three-fourths of an inch to form a drip pan 44. One side of this pan 44 is closed and the other has two drain tubes 45 which serve to carry off any of the melted compound which may drop from the ductor roller 18, which can easily happen if more compound is allowed to come through the fountain than can be taken care of conveniently by the ductor roller 18. I also attach to the shield 43 an extension 46 which extends to the rear end of the press and directly under the ink fountain 13. This extension 46 also forms a drip pan to catch any of the compound which might drop from the fountain 13. These drip pans are very essential to the success of any good work for should any compound come in contact with the printing plate 47 it would stick to the plate and each particle of this crystallized compound would cause the good compound to be separated and make a spotted print instead of a solid one.

Thus the shield 43 and extension 46 protect any excess compound from being crystallized and either holds it until it is removed or if melted it will drain through the drain tubes 45 which can be arranged to drip into a pan (not shown) outside of the press. This not only keeps the work clean, but also saves any excess compound that might drop from the ductor roller 18 or the ink fountain 13.

On the lock-up base 2 I mount a printing plate 47, only one being shown, though obviously any number or shape of plates may be used. This plate is nothing more nor less than a regular electroplate used for producing solids in ordinary printing. This printing plate 47 obviously can be of any desired shape and I provide for it being held in the desired position on the lock-up base 2 by means of adjustable clamps 48 which are held in place by screws 49 which extend into the lock-up base 2. This lock-up base 2 is preferably provided with a plurality of apertures which are drilled and tapped one inch apart and countersunk to permit the use of flat machine screws 49. I have found it necessary to keep the screws 49 in the apertures in the lock-up base 2 at all times in order that the melted wax may not fill up the holes. I have found that it is preferable to have the face of the printing plates 47 nickled and polished as this produces a very much smoother finish and a much more even one for the carbon than where they are not so finished.

I have also found that in order to obtain the best results it is necessary to cover the printing cylinder 50 with a soft felt packing 51 instead of the usual draw sheet used in ordinary printing. By the use of this elastic cushion, I am able to keep the edges of the printed form free from excess carbon and to produce a much better result.

It will be apparent from the foregoing description that all of the parts used on the press for printing spot carbon by impression can be quickly and easily removed from the press with the exception of heating element 11 under the ink plate 10 and the heating element 14 under the ink fountain 13 thus allowing the press to be used on the regular class of letter press printing.

Practice has shown that the temperature necessary to obtain satisfactory results is very essential. As stated before too much heat causes the compound to penetrate the stock and is liable to burn the carbon while not enough heat will cause the compound to collect on the printing plate in excess and makes an uneven print which easily offsets when put under the trimming knife when the carbonized forms are trimmed to proper size. It is necessary at all times to watch the heat on all of the elements which can be controlled by the control switches on panel 42. On account of the high temperature care must be used in putting the rollers in and out of the press so that they do not come in contact with the heating elements which would damage the rollers. If it becomes necessary to stop the press longer than one minute the composition rollers should be removed. As long as the rollers are in motion it is not necessary that stock be run through the press. It is always well to clean the printing plate before running stock after the press has been standing idle with the heat turned on the lock-up base 2, this precaution should be taken as the carbon in the compound will burn out around 200 degrees F. and when this happens to get several impressions that look right but will not make a copy, which defeats the carbon purpose. As it takes approximately one and a half hours to heat the compound, press and rollers to the right working temperature, I find it is desirable to place the composition rollers in an electric heated steel cabinet (not shown) which brings the rollers to the correct temperature with no less of time. Whenever the composition rollers are taken from the press they should always be put back in this cabinet. By melting the compound before putting same in the ink fountain 13 considerable time can be saved and at the same time the compound can be inspected for the hard particles that it may contain. The best results are obtained by keeping the entire unit at the lowest temperature, that will give satisfactory results.

The compound used can be procured from any one of the leading ink manufacturers and can be procured in black, red, blue, green and purple. When melted the compound must be absolutely free from any hard particles no matter how small as they will cause the same results as the crystallized ink mentioned before. When the results show white spots on the print it is either one of two things, crystallized compound or particles in the compound that will not melt. The shield 43 and drip pans 44 and 46 attached to the heating element 26 should take care of the crystallization and by melting the compound in a vessel and straining it through a very fine brass strainer before placing it in the ink fountain I can eliminate the hard particles in the compound.

Care must be exercised in setting the form rollers 19 and 20. The setting should be done while the rollers are hot as it is only natural that being rubber they will swell to some extent. They should be set so they barely touch the ink plate 10 otherwise they are liable to go to pieces when they come in contact with either the ink plate 10 or the printing plate 14 that is secured to the lock-up base 2.

When any of the rollers fail to turn the melted compound will immediately collect at the bottom of such roller and run off, which not only causes waste but stops the distribution of the compound making an uneven impression, also filling up the lock-up base 2, which will eventually be transferred to the paper stock as it travels around the cylinder causing more waste.

It will be obvious from the hereinbefore contained description that my invention makes it possible to employ an ordinary automatic feed printing press for the purpose of producing spots of wax carbon which can be located at any predetermined position on a sheet of paper, as many spots as may be desired and as varied shapes for the carbon spots as may be required for the work in hand. It is also possible to run colors. The ink fountain 13, being provided with a divider 52 of standard construction used on printing presses to keep the compound in one part of the fountain when the entire fountain is not required.

It will also be seen that it is possible to remove the added parts when the spot carboning work is completed and the press can be used for its regular work since the heating elements, which are not easily removable, can be turned off and they do not interefere with the operation of the press in the slightest degree.

Having described my invention, what I regard as new and desire to secure by Letters Patent is:

1. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller, and means on the ductor roller cooperating with the means on the fountain roller and means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, and electrical means to maintain the temperature of said lock-up base at a predetermined point.

2. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the fountain roller, a gear on the vibrator roller and a gear on the ductor roller alternately meshing with the first mentioned gears for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures on said base, means to secure a printing plate or plates on said lock-up base, and electric heating elements to maintain the lock-up base and all of the parts which come in contact with the carbon at a predetermined temperature.

3. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller, and means on the ductor roller cooperating with the means on the fountain roller and the means on the vibrator roller for positively rotating the ductor roller while in contact with either of the other rollers, a lock-up base mounted on the type bed of the press, there being a plurality of spaced drilled and tapped apertures in said base, means to secure a printing plate or plates on said lock-up base, and electric heating elements to maintain the lock-up base and all of the parts which come in contact with the carbon at a predetermined temperature.

4. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and means on the vibrator roller for positively rotating the ductor roller while in contact with either of the other rollers, a lock-up base mounted on the type bed of the press, there being a plurality of spaced drilled and tapped apertures in said base, means to secure a printing plate or plates on said lock-up base, and electric heating elements to maintain the lock-up base and all of the parts which come in contact with the carbon at a predetermined temperature, and means to vary said temperature.

5. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the plate, there being a plurality of spaced drilled and tapped apertures in said base, means to secure a printing plate or plates on said lock-up base, electrical means to maintain the temperature of said lock-up base at a predetermined point, and means to vary said temperature.

6. The combination with a printing press having an ink fountain, an ink fountain roller, a vibrator roller, a ductor roller, a type bed and an ink plate and a printing cylinder; of a heating element mounted adjacent the ink fountain for heating a wax carbon compound in the fountain, means to maintain said fountain at a predetermined temperature, means on the fountain roller, means on the vibrator roller and means on the ductor roller cooperating with means on the fountain roller and means on the vibrator roller for positively rotating the ductor roller while in contact with either of the other rollers, a lock-up base mounted on the type bed of the press, there being a plurality of spaced drilled and tapped apertures in said base, means to secure a printing plate or plates on said lock-up base, electric heating elements to maintain the lock-up base and all of the parts which come in contact with the carbon at a predetermined temperature, means to vary said temperature, and a cushion on the printing cylinder.

7. The combination with a printing press having an ink fountain, an ink fountain roller, a vibrator roller, a ductor roller, a type bed and an ink plate and a printing cylinder; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, electrical means to maintain the temperature of said lock-up base at a predetermined point, and a cushion on the printing cylinder.

8. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, the surface of said plate or plates being plated and polished, and electrical means to maintain the temperature of said lock-up base at a predetermined point.

9. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, electrical means to maintain the temperature of said lock-up base at a predetermined point, and combined shield and drip pans arranged to catch and direct any excess carbon away from the press.

10. The combination with a printing press having form rollers, a steel vibrator roller, a ductor roller, a reciprocating bed plate having a rack, and a train of gears on said form and vibrator rollers actuated by the reciprocation of the type bed plate rack which rotates said rollers; of a gear on said ductor roller cooperating intermittently with the gear on the vibrator roller, a lock-up base mounted on the type bed of the press, there being a plurality of spaced drilled and tapped apertures in said base, means to secure a printing plate or plates on said lock-up base, and electrical means to maintain the temperature of said lock-up base at a predetermined point.

11. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the ink fountain roller shaft, a gear on the ductor roller shaft, a gear splined on the vibrator roller shaft, said ductor gear being rotated by the gears on said fountain roller and said vibrator roller alternately as the ductor roller travels between them, a spring on said vibrator roller shaft to maintain said gear in the same plane as the gear on the ductor and fountain roller, a lock-up base on the type bed, a printing plate or plates on said lock-up base, and electric heating elements to maintain the lock-up base and all parts which contact with the carbon at a predetermined temperature.

12. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base, mounted on the type bed of the press, means to secure a printing plate or plates on said lock-up base, and electrical means to maintain the temperature of said lock-up base at a predetermined point.

13. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base, mounted on the type bed of the press, means to secure a printing plate or plates on said lock-up base, and electrical heating elements to maintain the lock up base and all of the parts which come in contact with the carbon at a predetermined temperature.

14. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base, there being a plurality of spaced drilled and tapped apertures in said base, mounted on the type bed of the press, means to secure a printing plate or plates on said lock-up base, and electrical means to maintain the temperature of said lock-up base at a predetermined point.

15. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base, mounted on the type bed of the press, there being a plurality of spaced drilled and tapped apertures on said base, means to secure a printing plate or plates on said lock-up base, and an electric heating element to maintain the lock-up base and all of the parts which come in contact with the carbon at a predetermined temperature.

16. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, there being a plurality of spaced drilled and tapped apertures in said base, means to secure a printing plate or plates on said lock-up base, electric heating elements to maintain the lock-up base and all of the parts which come in contact with the carbon at a predetermined temperature, electrical conductors to carry current to elements, and a plurality of sliding contacts to connect the elements in the lock-up base to a source of electric current.

17. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, the surface of said plate or plates being plated and polished, electrical means to maintain the temperature of said lock-up base at a predetermined point, electrical conductors to convey current to said elements, and a plurality of sliding contacts to connect the elements in the base and ink plate to a source of electric current supply.

18. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with means on the fountain roller and means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures in said base, means to secure a printing plate or plates on said lock-up base, the surface of said plate or plates being plated and polished, electrical means to maintain the temperature of said lock-up base at a predetermined point, electrical conductors to convey current to said elements, a plurality of sliding contacts to connect the elements in the base and ink plate to a source of electric current supply, said contacts comprising a plurality of metal rods carried by and reciprocated with said type bed and a plurality of carbon brushes connected to a source of electric current supply.

19. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the fountain roller, a gear on the vibrator roller and a gear on the ductor roller alternately meshing with the first mentioned gears for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, there being a plurality of spaced drilled and tapped apertures on said base, means to secure a printing plate or plates on said lock-up base, electric heating elements to maintain the lock-up base and all of the parts which come in contact with the carbon at a predetermined temperature, electrical conductors to convey current to said elements, and a plurality of sliding contacts to connect the elements in the base and ink plate to a source of electric current supply.

20. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, means to secure a printing plate or plates on said lock-up base, electric heating elements to maintain the lock-up base and all of the parts which come in contact with the carbon at a predetermined temperature, electrical conductors to convey current to said electric heating elements, a plurality of sliding contacts to connect said electric heating elements in the base to a source of electric current supply, and means to vary the amount of current flowing through said elements.

21. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, and electrical means to maintain the temperature of said lock-up base at a predetermined point.

22. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the fountain roller, a gear on the vibrator roller and a gear on the ductor roller alternately meshing with the first mentioned gears for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, and electric heating elements to maintain the lock-up base and all of the parts which come in contact with the carbon at a predetermined temperature.

23. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, means to secure a printing plate or plates on said lock-up base, and electric heating elements to maintain the lock-up base and all of the parts which come in contact with the carbon at a predetermined temperature.

24. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, means to secure a printing plate or plates on said lock-up base, and electric heating elements to maintain the lock-up base and all of the parts which come in contact with the carbon at a predetermined temperature, and means to vary said temperature.

25. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, and electrical means to maintain the temperature of said lock-up base at a predetermined point, and means to vary said temperature.

26. The combination with a printing press having an ink fountain, an ink fountain roller, a vibrator roller, a ductor roller, a type bed and an ink plate and a printing cylinder; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, means to secure a printing plate or plates on said lock-up base, electric heating elements to maintain the lock-up base and all of the parts which come in contact with the carbon at a predetermined temperature, means to vary said temperature, and a cushion on the printing cylinder.

27. The combination with a printing press having an ink fountain, an ink fountain roller, a vibrator roller, a ductor roller, a type bed and an ink plate and a printing cylinder; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, electrical means to maintain the temperature of said lock-up base at a predetermined point, and a cushion on the printing cylinder.

28. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, the surface of said plate or plates being plated and polished, and electrical means to maintain the temperature of said lock-up base at a predetermined point.

29. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, and means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, electrical means to maintain the temperature of said lock-up base at a predetermined point, and combined shield and drip pans arranged to catch and direct any excess carbon away from the press.

30. The combination with a printing press having form rollers, a steel vibrator roller, a ductor roller, a reciprocating type bed plate having a rack and a train of gears on said form and vibrator rollers actuated by the reciprocation of the type bed plate rack which rotates said rollers; of a gear on said ductor roller cooperating intermittently with the gear on the vibrator roller, a lock-up base mounted on the type bed of the press, means to secure a printing plate or plates on said lock-up base, and electrical means to maintain the temperature of said lock-up base at a predetermined point.

31. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base, mounted on the type bed of the press, and means to secure a printing plate or plates on said lock-up base, and electrical means to maintain the temperature of said lock-up base at a predetermined point.

32. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermied temperature, means on the fountain roller, means on the vibrator roller and means on the ductor roller cooperating with the means on the fountain roller and the means on the vibrator roller for positively rotating the ductor roller while in contact with either of the other rollers, a lock-up base mounted on the type bed of the press, means to secure a printing plate or plates on said lock-up base, electric heating elements to maintain the lock-up base and all of the parts which come in contact with the carbon at a predetermined temperature, electrical conductors to carry current to elements, and a plurality of sliding contacts to connect the elements in the lock-up base to a source of electric current.

33. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, the surface of said plate or plates being plated and polished, electrical means to maintain the temperature of said lock-up base at a predetermined point, electrical conductors to convey current to said elements, and a plurality of sliding contacts to connect the elements in the base and ink plate to a source of electrical current supply.

34. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, the surface of said plate or plates being plated and polished, electrical means to maintain the temperature of said lock-up base at a predetermined point, electrical conductors to convey current to said elements, a plurality of sliding contacts to connect the elements in the base and ink plate to a source of electric current supply, said contacts comprising a plurality of metal rods carried by and reciprocated with said type bed, and a plurality of carbon brushes connected to a source of electric current supply.

35. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the fountain roller, a gear on the vibrator roller and a gear on the ductor roller alternately meshing with the first mentioned gears for positively rotating the ductor roller while in contact with either of the other rollers, electric heating elements to maintain the temperature of said rollers at a predetermined point, electrical means to maintain the ink plate at a predetermined temperature, a lock-up base mounted on the type bed of the press, means to secure a printing plate or plates on said lock-up base, electric heating elements to maintain the lock-up base and all of the parts which come in contact with the carbon at a predetermined temperature, electrical conductors to convey current to said elements, a plurality of sliding contacts to connect the elements in the base and ink plate to a source of electric current supply.

36. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, means on the fountain roller, means on the vibrator roller and means on the ductor roller cooperating with the means on the fountain roller and the means on the vibrator roller for positively rotating the ductor roller while in contact with either of the other rollers.

37. The combination with a printing press having an ink fountain, an ink fountain roller, a vibrator roller, a ductor roller, a type bed and an ink plate; of a heating element mounted adjacent the ink fountain for heating a wax carbon compound in the fountain, means to maintain said fountain at a predetermined temperature, a gear on the fountain roller, a gear on the vibrator roller and a gear on the ductor roller alternately meshing with the first mentioned gears for positively rotating the ductor roller while in contact with either of the other rollers.

GEORGE A. RUTKOSKIE.